(12) United States Patent
Levy et al.

(10) Patent No.: US 9,867,154 B2
(45) Date of Patent: Jan. 9, 2018

(54) SYNCHRONIZATION CHANNEL STRUCTURE FOR A SHARED CHANNEL (71) Applicant: Avago Technologies General IP (Singapore) Pte. Ltd., Singapore (SG)

(72) Inventors: Sharon Levy, Binyamina (IL); Sindhu Verma, Bangalore (IN); Shubhodeep Adhikari, Bangalore (IN)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 78 days.

(21) Appl. No.: 14/919,403

(22) Filed: Oct. 21, 2015

(65) Prior Publication Data
US 2016/0128008 A1    May 5, 2016

(30) Foreign Application Priority Data

Nov. 3, 2014   (IN) ............................ 5487/CHE/2014

(51) Int. Cl.
*H04J 3/06*   (2006.01)
*H04W 56/00*  (2009.01)
*H04W 24/02*  (2009.01)

(52) U.S. Cl.
CPC ......... *H04W 56/001* (2013.01); *H04W 24/02* (2013.01)

(58) Field of Classification Search
None
See application file for complete search history.

(56) References Cited

U.S. PATENT DOCUMENTS

| 2014/0341051 | A1* | 11/2014 | Gaal ..................... | H04W 24/10 370/252 |
| 2015/0049741 | A1* | 2/2015 | Chen ..................... | H04W 48/12 370/336 |
| 2016/0073405 | A1* | 3/2016 | Khawer ................ | H04L 5/0007 370/329 |
| 2016/0269978 | A1* | 9/2016 | Bashar .................... | H04J 11/00 |

OTHER PUBLICATIONS

Broadcom Corporation, Cablelabs, Deployment and Evaluation Considerations for LAA-LTE (R1-144234), Written Contribution at 3GPP Meeting, Ljubljana, Slovenia, Oct. 6-10, 2014, 2 pages.
Broadcom Corporation, Cablelabs, PHY enhancement areas & options to support robust coexistence LAA (R1-144233), Written Contribution at 3GPP Meeting, Ljubljana, Slovenia, Oct. 6-10, 2014, 3 pages.
Broadcom Corporation, Cablelabs, Robust-Coexistence Considerations for LAA-LTE (R1-144232), Written Contribution at 3GPP Meeting, Ljubljana, Slovenia, Oct. 6-10, 2014, 2 pages.
Ericsson et al., Study on Licensed-Assisted Access using LTE (RP-141664), Written Contribution at 3GPP Meeting, Edinburgh, Scotland, Sep. 9-12, 2014, 8 pages.
Wi-Fi Alliance, Wi-Fi Certified Voice-Enterprise: Delivering Wi-Fi voice to the enterprise, dated May 2012, 11 pages.

* cited by examiner

*Primary Examiner* — Minh-Trang Nguyen
(74) *Attorney, Agent, or Firm* — Foley & Lardner LLP (57) ABSTRACT

A method includes transmitting, at an LTE device configured to transmit data over an unlicensed band, first synchronization data over a first frequency channel of the unlicensed band during a timeframe. The method further includes transmitting, at one of the first LTE device or a second LTE device, second synchronization data over a second frequency channel of the unlicensed band during the same timeframe. The data transmissions of at least one of the first LTE device or the second LTE device are coordinated based on the synchronization data.

20 Claims, 5 Drawing Sheets

SYNCHRONIZATION CHANNEL STRUCTURE FOR A SHARED CHANNEL

CROSS-REFERENCE TO RELATED APPLICATIONS

The present application claims priority to Indian Provisional Patent Application No. 5487/CHE/2014, filed Nov. 3, 2014, which is incorporated herein by reference in its entirety.

FIELD

The present disclosure relates generally to the field of networking, including, but not limited to, the use of Long-Term Evolution (LTE) in a small cell or access point in an environment.

BACKGROUND

LTE is a standard for wireless communication. LAA-LTE (Licensed Assisted Access-LTE, also called LTE-U or unlicensed LTE) generally makes use of an unlicensed spectrum (i.e., a spectrum not reserved for a particular company, network, etc.). It is difficult to operate in the unlicensed spectrum, as interference in the unlicensed band can occur between various devices attempting to communicate.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Referring generally to the figures, systems and methods for LTE communications in an unlicensed band are shown and described. The systems and methods described herein can be implemented for a plurality of LTE devices communicating LTE signals with one another over the unlicensed band.

In some embodiments, the LTE devices transmit synchronization data over frequency channels of the unlicensed band. The synchronization data is then used by the various LTE devices in an environment (e.g., LAA-LTE access points, user equipment or user end devices) to coordinate data transmissions between the devices. In other words, the synchronization data is used to modify synchronization parameters (e.g., characteristics of and/or data transmitted on synchronization channels) in order to improve transmissions over the unlicensed band. For example, a LAA-LTE cell or access point transmits synchronization data, and user end devices detect the data and coordinate transmissions (e.g., align transmission times, report different measurements, etc.) based on the data.

In some embodiments, the synchronization data is transmitted over channels of the unlicensed band via synchronization signals a number of times during a timeframe for transmission. The synchronization signals are transmitted non-periodically in some embodiments. The LTE devices dynamically determine when to transmit the synchronization signals during the timeframe in some embodiments. The data transmissions are coordinated based on the synchronization data in the synchronization signals in some embodiments.

In some embodiments, the synchronization data includes a primary synchronization signal (PSS), a secondary synchronization signal (SSS), and a master information block (MIB), and are transmitted for each cell in an environment. The synchronization data is used to coordinate data transmissions. For example, the PSS is used to estimate the time of the message, the SSS is used for detecting the cell ID, and the MIB is transmitted at a known time pattern. The data is transmitted over a six resource block (using one symbol for the PSS and SSS and four symbols for the MIB) at a particular frequency offset (e.g., each resource block has a 180 KHz bandwidth). In some embodiments, the LTE devices use the benefit of having a, for example, 18 MHz over the 20 MHz channel in the unlicensed band to transmit instead of dealing with a smaller bandwidth (e.g., 1.08 MHz over 1.4 MHz).

LAA-LTE (or LTE-U) is a standard for wireless communication that makes use of the unlicensed spectrum. In various exemplary embodiments of the present disclosure, the small cell is, or includes, a LAA-LTE access point facilitating use of the unlicensed spectrum (e.g., to avoid interference).

The present disclosure describes a small cell design integrating a LAA-LTE access point. In various other embodiments, the small cell design includes a LAA-LTE access point and one or more WiFi access points integrated within or coupled to the small cell to help facilitate use of the unlicensed spectrum (e.g., avoid interference with WiFi devices and/or other devices also utilizing the unlicensed spectrum).

In the present disclosure, the terms "user equipment" and "user end device" are used interchangeably, and "UE" is used as an abbreviation of the terms. Further, the terms "LAA-LTE AP", "LTE access point", "small cell", "LAA cell" and other like terms are used interchangeably.

The present disclosure describes small cells with LAA-LTE capability; in various embodiments, the systems and methods herein are implemented on one or more of any types of devices (e.g., user equipment, such as phones, handsets and/or handheld computers, laptops tablets, etc. and/or access points, such as devices similar to LTE eNodeB (eNB) devices) with capability for LAA-LTE communications in the unlicensed spectrum.

Figure 1:
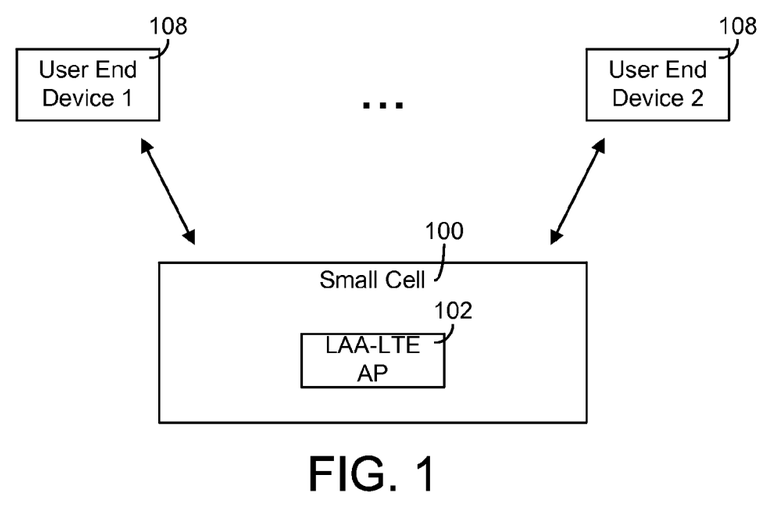
FIG. 1 is a block diagram of an environment including a small cell with LAA-LTE capability and a plurality of devices in communication with the small cell according to an exemplary embodiment.
Figure 2:
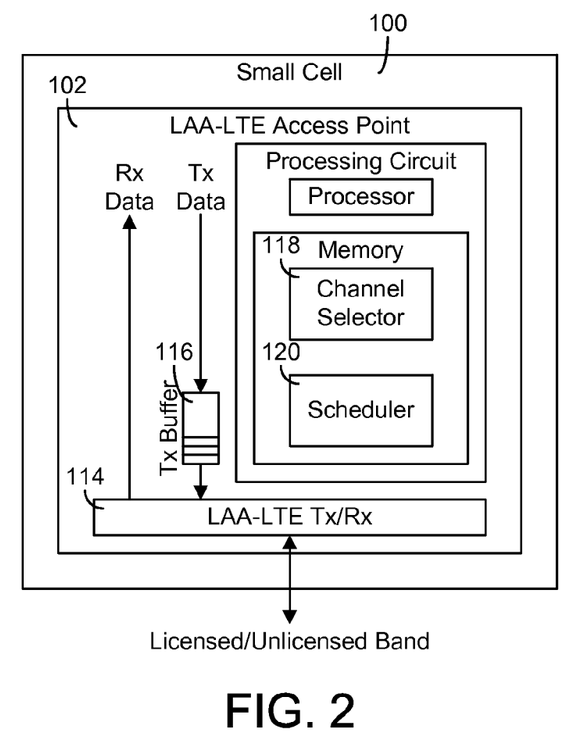
FIG. 2 is a more detailed block diagram of the small cell design of FIG. 1 according to an exemplary embodiment.

Referring to FIGS. 1-2, block diagrams of a small cell 100 design are shown, according to exemplary embodiments. As shown in FIG. 1, small cell 100 includes a LAA-LTE access point (AP) 102; it should be understood that in some embodiments, LAA-LTE AP 102 is the small cell itself, and that the illustrated embodiment is not limiting. In other embodiments, various other configurations of small cell 100 are possible (e.g., small cell 100 includes multiple LAA-LTE APs, a combination of licensed LTE APs in parallel to LAA-LTE APs, one or more WiFi APs, etc.).

Referring further to FIG. 1, small cell 100 is shown in communication with a number of devices 108 (e.g., user equipment (UEs) or user end devices, other small cells including LAA-LTE APs, and other such devices). Small cell 100 is implementable in an environment such as an office, commercial or residential building, school, or any other type of environment in which devices connect wirelessly. Small cell 100 communicates with the various devices 108 by providing a network incorporating a variety of standards. For example, some devices 108 can communicate with small cell 100 via LAA-LTE, 802.11n WiFi, or 802.11ac WiFi. Referring to the present disclosure, devices 108 are described as communicating with small cell 100 via LAA-LTE. It should be understood that the environment can include any number or types of devices and that the embodiments described herein can be implemented for the various devices.

Referring more specifically to FIG. 2, an example embodiment of small cell 100 is shown. LAA-LTE AP 102 includes a transmitter/receiver circuit 114 for transmitting and receiving data, and a buffer 116 for data to be transmitted. In some embodiments, LAA-LTE AP 102 further includes a UART-based general circuit interface (GCI) interface, and a peripheral component interconnect express (PCIe) interface for communication with other modules within small cell 100.

LAA-LTE AP 102 is further shown to include a processing circuit including a processor and memory. The memory is shown to include channel selector 118 and scheduler 120. In some embodiments, the memory further includes other modules for controlling the activities of the access point. In some embodiments, the processor is, or includes, one or more microprocessors, application specific integrated circuits (ASICs), circuits containing one or more processing components, a group of distributed processing components, circuitry for supporting a microprocessor, or other hardware for processing. The processor executes computer code stored in memory to complete and facilitate the activities described herein. The memory is any volatile or non-volatile computer-readable storage medium capable of storing data or computer code relating to the activities described herein. For example, the memory is shown to include modules which are computer code modules (e.g., executable code, object code, source code, script code, machine code, etc.) for execution by the processor. According to some embodiments, the processing circuits represent a collection of processing devices (e.g., servers, data centers, etc.). In such cases, the processor represents the collective processors of the devices and the memory represents the collective storage devices of the devices. The processing circuit completes the activities described herein by executing software instructions stored in the memories in some embodiments. In some embodiments, channel selector 118 and/or scheduler 120 are implemented outside of the memory (e.g., using hardware-based circuitry).

Channel selector 118 selects a channel for communications for small cell 100. When LAA-LTE and WiFi APs operate on the same unlicensed band, the access points can cause co-channel interference and data collision. In some embodiments, channel selector 118 scans for neighboring LAA-LTE APs and WiFi APs that could cause interference. Channel selector 118 determines the current channel allocation for the RF environment, in some embodiments. Scheduler 120 schedules transmissions by LAA-LTE AP 102.

Figure 3A:
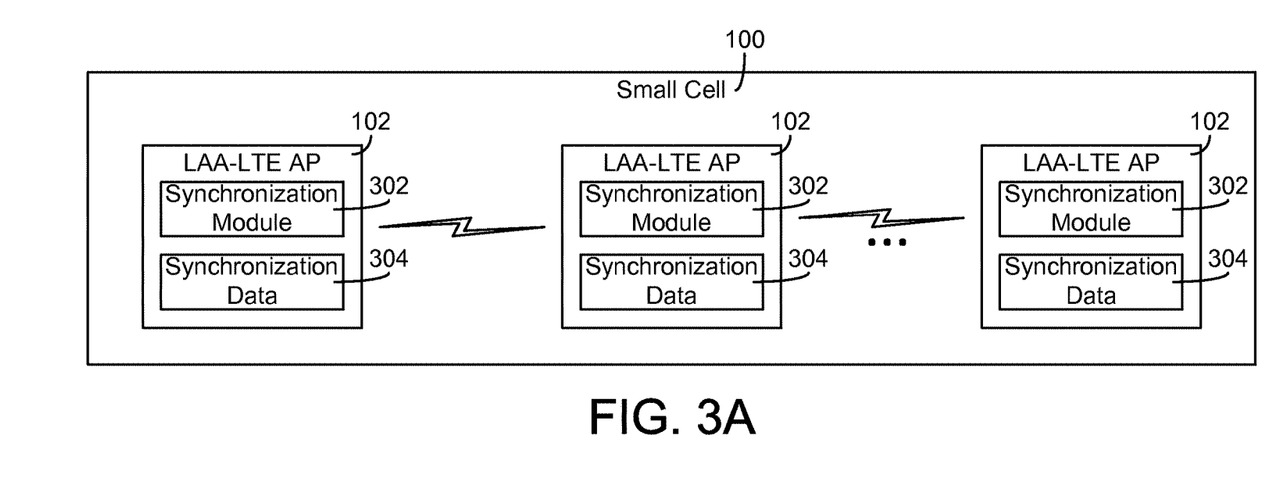
FIGS. 3A-B are block diagrams of a plurality of LAA-LTE devices in communication with one another according to some embodiments.
Figure 3B:
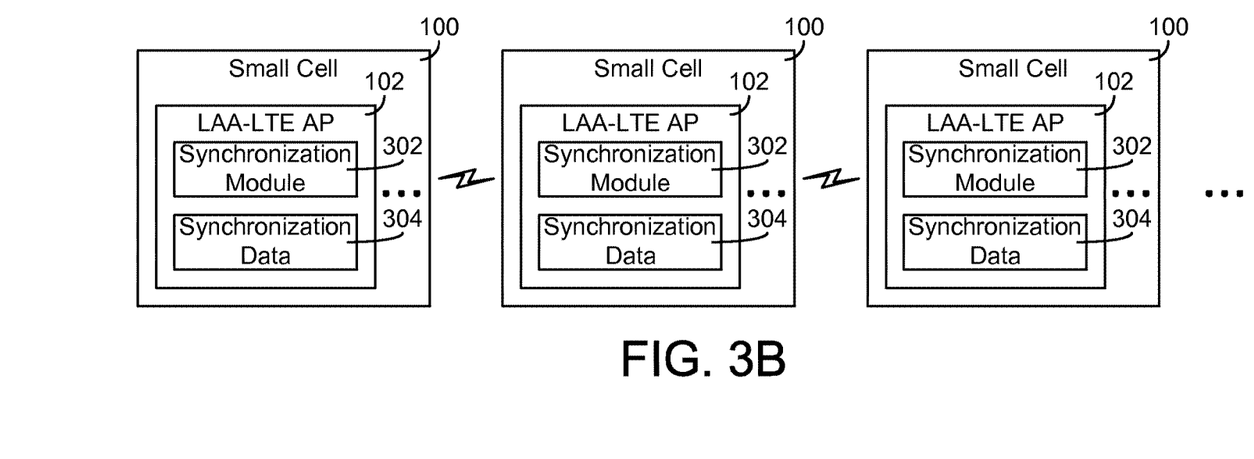

Referring now to FIGS. 3A-B, a plurality of devices (e.g., LAA-LTE APs 102) are shown in communication with one another. In the embodiment of FIG. 3A three LAA-LTE APs are shown within a single small cell 100 as part of a small cell assembly. In the embodiment of FIG. 3B, three small cell 100s are shown, each including an individual LAA-LTE AP. As described above, in various embodiments, each LAA-LTE AP is be its own small cell, or there can be one or more LAA-LTE APs in each small cell. The embodiments illustrated in FIGS. 3A-B should not be construed as limiting.

Each LAA-LTE AP 102 includes a synchronization module 302 which generates synchronization data 304. Synchronization module 302 facilitates transmission of synchronization data 304 between the LAA-LTE APs. In some embodiments, the transmission of the synchronization data occurs over a shared channel on the unlicensed band. The synchronization data generally includes a PSS, SSS, and MIB, as described above. In some embodiments, the PSS is used to estimate the time, the SSS is used for detecting an identifier of the cell or access point, and the MIB includes parameters used to acquire other information from the cell. In some embodiments, the PSS, SSS, and/or MIB are transmitted on a known or predetermined time pattern. In some embodiments, the PSS and SSS are transmitted using one symbol, or timeframe, and the MIB is transmitted using four symbols or timeframes, resulting in the PSS, SSS, and MIB being transmitted using six resource blocks.

In some embodiments, LAA-LTE APs 102 are all part of a single small cell 100 of LTE devices, as shown in FIG. 3A. Synchronization data is transmitted from each LAA-LTE AP 102 during the same timeframe over different frequency channels of the unlicensed band. The synchronization data is transmitted to the plurality of LAA-LTE APs within small cell 100 and user end devices.

In some embodiments, some LAA-LTE APs 102 belong to a first small cell while some LAA-LTE APs 102 belong to a second small cell. For example, in FIG. 3B, three LAA-LTE APs 102 are shown belonging each to a single small cell 100. Further, in some embodiments, each small cell can be part of a plurality of small cells. Synchronization data is transmitted from each LAA-LTE AP 102 associated with each of the plurality of small cells during the same timeframe over different frequency channels of the unlicensed band. The synchronization data is transmitted to the plurality of LAA-LTE APs at different small cells and to user end devices.

Figure 4:
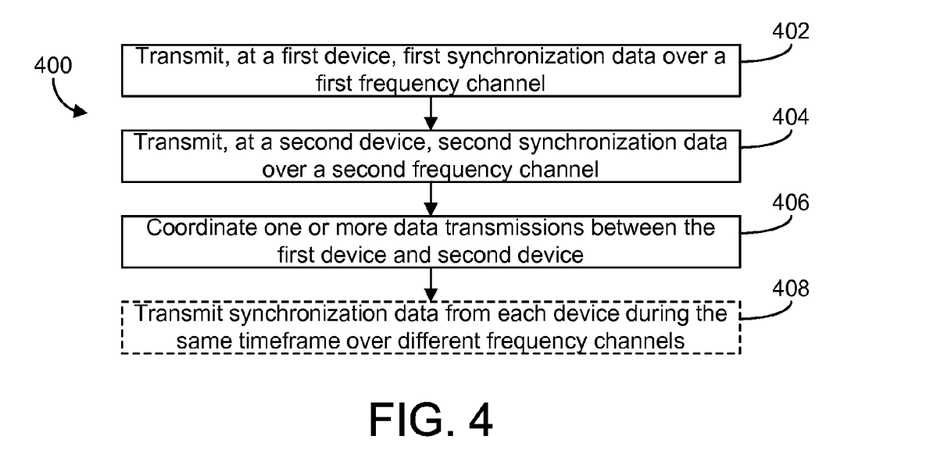
FIG. 4 is a flow chart of a flow of operations for coordinating transmissions between LAA-LTE devices using synchronization data according to some embodiments.

Referring now to FIG. 4, a flow chart of a flow 400 of operations for coordinating transmissions between LAA-LTE devices using synchronization data is shown, according to an exemplary embodiment. Flow 400 can be executed by, for example, a synchronization module 302.

Flow 400 includes transmitting, at a first device, first synchronization data over a first frequency channel (operation 402). The first synchronization data is transmitted over the first frequency channel of the unlicensed band during a timeframe. Flow 400 includes transmitting, at a second device, second synchronization data over a second frequency channel (operation 404). The second synchronization data is transmitted over the second frequency channel of the unlicensed band during the same timeframe as the first synchronization data. Flow 400 further includes coordinating one or more data transmissions between the two devices based on the synchronization data (operation 406).

In some embodiments, the first and second devices are all part of a single cell of LTE devices (e.g., each LAA-LTE AP is part of the same single cell 100, as shown in FIG. 3A). Flow 400 then includes transmitting synchronization data from each device during the same timeframe over different frequency channels of the unlicensed band (operation 408). The synchronization data is received at the various devices 108 (e.g., the UEs) and used to improve the timing estimation of the UEs by combining the data from the plurality of receptions at the UEs.

In some embodiments, the first device and second device are part of a plurality of cells (e.g., each LAA-LTE AP belongs to a particular small cell in an environment including a plurality of small cells, as shown in FIG. 3B). Flow 400 then includes transmitting synchronization data from devices associated with the different cells during the same timeframe over different frequency channels of the unlicensed band (operation 408). In some embodiments, the different frequency channels are on two different frequencies. In some embodiments, the same frequency channel is used, but with different offsets.

Figure 5:
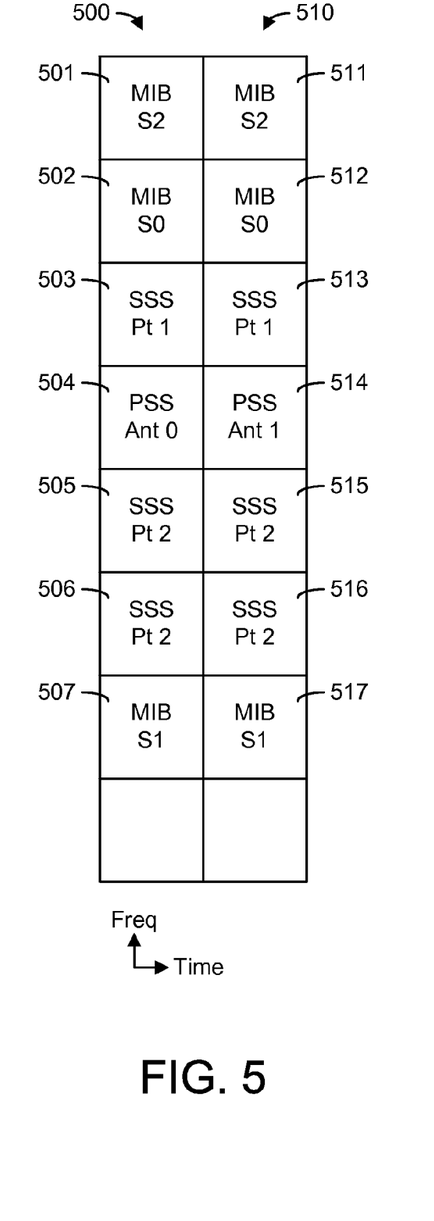
FIG. 5 illustrates an example synchronization signal including synchronization data that is transmitted over a frequency channel in an unlicensed band according to some embodiments.
Figure 6:
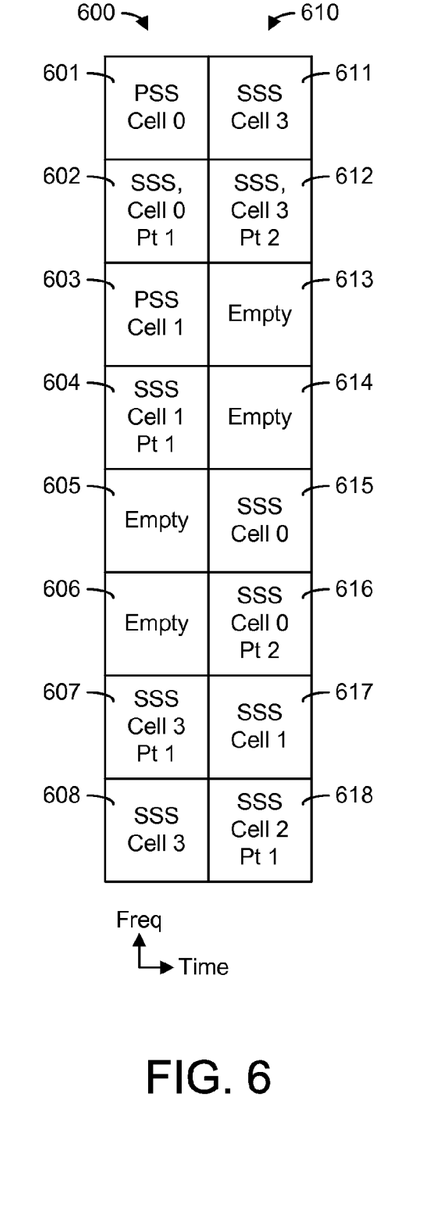
FIG. 6 illustrates another example synchronization signal including synchronization data that is transmitted over a frequency channel in an unlicensed band according to some embodiments.

Referring now to FIGS. 5-6, example synchronization signals are illustrated that can be transmitted over the unlicensed band. More particularly, two modifications to the synchronization signals are illustrated in FIGS. 5-6 that improve the synchronization between LAA-LTE APs and small cells in an environment. The modifications allow for synchronization data to be transmitted for different transmission windows in the unlicensed band in some embodiments.

Synchronization between LAA-LTE APs is based on transmitting a PSS at a specific location (e.g., a primary component carrier or PCC) to a number of known offset secondary component carriers (SCC), for example the user end devices of the environment. The PSS of the synchronization signal is used to help detect a time and cell ID group for the message, while the SSS of the synchronization signal is used to help in detecting the cell ID.

Based on the cell ID and timing, the UE or user end device determines the expected frame timing, so that the UE can attempt to demodulate the common reference symbols and decode the MIB of the synchronization signal. The MIB includes information defining the frame timing (e.g., when the signal was transmitted, at a known time pattern) as well as parameters that define the way to decode the control region (e.g., information used to transmit messages over the unlicensed band). Other system information can be sent as regular data over the shared channel.

In some embodiments, a synchronization channel in the unlicensed band allow transmissions as described in the present disclosure for any size bandwidth (e.g., channel bandwidths from 1.4 MHz to 20 MHz). For example, a PSS, SSS, and MIB can be transmitted over six resource blocks, each block 180 KHz wide (in some embodiments, the PSS and SSS are transmitted over one resource block and the MIB over four resource blocks). The embodiments described herein can accommodate transmission for any size channel and any number of resource blocks.

An LAA-LTE AP, in some embodiments, can use a channel with a bandwidth of 20 MHz, which allows more information to be transmitted in each signal and for avoiding needing to transmit the signal at a specific time (as opposed to, for example, a 1.4 MHz channel). For the LAA-LTE AP, the channel it transmits on could be occupied in the time the synchronization signal is sent, which can hurt measurements by the receiving device used for handover and idle mode configuration. Further, some information transmitted with the synchronization signal (e.g., the cell ID, a system information block (SIB1) including a public land mobile network (PLMN) metric) can be assumed to be transmitted at a particular time, which can an invalid assumption as described above in some embodiments.

In some embodiments, the synchronization signals and more particularly the MIB are not limited to a smaller bandwidth (e.g., 1.4 MHz). This allows synchronization sequences and an extended MIB to be incorporated into a single synchronization signal that can be sent at a window (and not at a specific time).

FIG. 5 illustrates a modification to a synchronization signal oriented to single cell behavior (i.e., a modification oriented towards synchronizing between two devices). FIG. 6 illustrates a modification to a synchronization signal oriented for a system including many devices (i.e., many coordinated LAA-LTE APs in an environment).

Referring to FIG. 5, a synchronization signal including a PSS, SSS, and MIB (including required common pilot sequences) is shown according to some embodiments. The PSS, SSS, and MIB are combined together into a synchronization signal including two symbols 500, 510, transmitted at a first and second time, in the illustrated embodiment. In some embodiments, the PSS, SSS, and MIB can be transmitted using a single symbol, or timeframe. Using a single symbol or small number of symbols to transmit all synchronization data for a cell allows for flexible timing in transmitting the PSS, SSS, and MIB (by transmitting the symbols at different times). For instance, the synchronization data can be transmitted at one or more times from among a set of available transmission windows, rather than at predetermined time patterns.

As shown in FIG. 5, the first symbol 500 includes multiple resource block (RB) groups 501-507, each group transmitted at a different frequency (e.g., staggered from high frequency to low frequency) representing a single symbol in a legacy LTE system. Each group includes information such as a portion of the PSS, SSS, and MIB. For example, first symbol 500 includes three legacy MIB symbols 501, 502, 507 (shown as MIB S0, MIB S1, and MIB S2), three SSS symbols 503, 505, 506, and a PSS symbol 504. Each group is transmitted in a particular window (e.g., a 1.08 MHz channel). The second symbol 510 can be transmitted at a second time, therefore resulting in the full synchronization signal being transmitted over multiple timeslots. As compared to the first signal, the second signal includes a second portion of the PSS signal at symbol 514 (PSS Ant 1 instead of PSS Ant 0) The other symbols 510, 511, 512, 513, 515, 516, 517 are identical to their corresponding symbols in symbol 500. The combination of the first symbol 500 and second symbol 510 can be referred to as the synchronization symbol.

In some embodiments, a user end device receiving signals 500, 510 decodes both the SSS and PSS. In some embodiments, the PSS identified antenna ports to use, such as antenna ports 0 and 1 (shown as PSS Ant 0 and PSS Ant 1 in FIG. 5) to allow better detection of the SSS. In some embodiments, the MIB includes additional fields. For example, the MIB can include a PLMN field and a cell ID/color field. These fields replace the SIB1 field (e.g., a field for broadcasting access parameters and scheduling information to a user end device). As another example, the MIB can include an offset relative to the nominal PSS time (due to the use of the window for synchronization). The offset indication is used to indicate which opportunity (e.g., which transmission window) to use for future transmissions.

Referring to FIG. 6, another synchronization signal (including two consecutive signals 600, 610) including a PSS and SSS for multiple cells is shown. The synchronization signal of FIG. 6 allows for sharing several small cell synchronization patterns within one symbol or a small number of symbols (e.g., two symbols), in some embodiments. In other words, the synchronization signal of FIG. 6 is implemented for environments with a plurality of devices in communication with a LAA-LTE AP in some embodiments.

Similar to FIG. 5, the synchronization signal of FIG. 6 includes cells staggered from a high frequency to a low frequency, and is transmitted over two symbols and timeslots. In the embodiment of FIG. 6, a system information block for several cells are combined into the synchronization signal.

The first symbol 600 of the synchronization signal is shown to include several cells 601-608. For example, first signal 600 includes two PSS signals 601, 603 (labeled as PSS cell 0 and PSS cell 1, corresponding to different transmitting cells). First signal 600 also includes SSS signals 602, 604, 607, 608 (labeled as SSS cell 0 part 1, SSS cell 1 part 1, SSS cell 3 part 1, and SSS cell 3), which are portions of SSSs for different devices in the environment. For example, first symbol 600 includes at least a portion of the SSS for cell 0, cell 1, and cell 3. The second symbol 610 includes, among cells 611-618, further portions of the SSSs that were sent out in the first signal (e.g., cell 616 includes a second portion of a SSS for cell 0), as well as portions of new SSSs (e.g., portions of the SSS for cell 2).

Common timing opportunities can be used to signal different devices in the environment on the timing of the synchronization signals in some embodiments. Each user end device in the environment reports in the licensed channel a statistic for each cell detection in some embodiments. A node or device in the environment estimates an interference level for one or more other devices of the environment in some embodiments. For example, an interference level is detected by user equipment based on how many times out of a total number of times a particular cell was detected. Such a detection is then used to determine the probability of collisions in the environment, when transmissions failed, and other such events.

In some embodiments, a first cell detects, prior to transmission of the synchronization signal, that the unlicensed channel is occupied by another device (e.g., a WiFi AP). The LAA-LTE AP is prohibited from transmission, so any user end device detecting the symbol can detect the lack of energy at the resource blocks allocated to the first cell. The user end device gathers the information and sends, to the serving cell, the location or a statistic of each detected cell in some embodiments. The serving cell combines the information and transmits the information to a central node that coordinates among the different LAA cells in some embodiments.

The synchronization signal of FIG. 6 is used to help location detection via timing, simplify the synchronization timing offset (as the systems are almost synchronized), and lower inter-cell interference in some embodiments.

In some embodiments, one possible way to format the synchronization signals is to use the legacy PSS/SSS locations in time but stack them in frequency. In LTE, a PSS or SSS occupies a small bandwidth (e.g., 1.08 MHz to fit into a 1.4 MHz channel). This allows for cell detection independent of the bandwidth size which can be small, such as, for example, 1.4 MHz in some embodiments. Bandwidth for a LAA-LTE AP can be available at multiples of, for example, 20 MHz. Thus, there is no need for a PSS or SSS to occupy the center bandwidth (e.g., the central 1.4 MHz bandwidth of the 20 MHz channel) of a channel in some embodiments.

Therefore, LAA-LTE AP 102 can stack multiple PSS and SSS transmissions in frequency in the channel (as shown in FIGS. 5-6) in some embodiments. For example, referring to FIG. 6, multiple PSSs and SSSs are shown stacked in different frequencies in some embodiments. This enables transmission of the PSSs and SSSs from a larger number of small cells (or even cells from different bands) over a shorter time in some embodiments. For example, in FIG. 6, SSSs for multiple cells are shown transmitted in a single timeframe (as shown, fourteen separate signals are stacked together in disjoint frequencies and transmitted at the same time). This reduces the resources used by the unlicensed channel to transmit detection signals and enables faster cell detection in some embodiments. In some embodiments, the frequencies are chosen in groups of six resource blocks (1.4 MHz bands) by a mapping that depends on the physical cell ID of each LAA-LTE AP.

Figure 7:
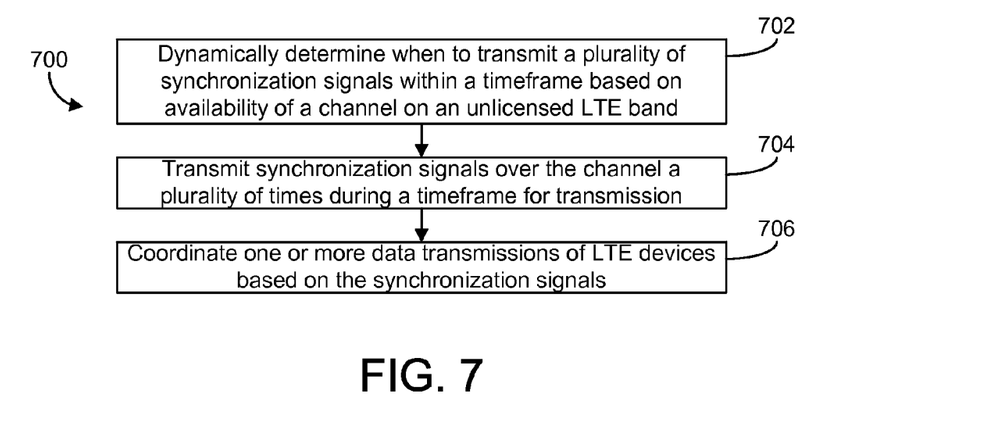
FIG. 7 is a flow chart of a flow of operations for performing detection and measurement of devices by a LAA-LTE AP and the corresponding transmission of cell detection signals according to some embodiments.

Referring now to FIG. 7, a flow chart of a flow 700 of operations for performing detection and measurement of devices by a LAA-LTE AP and the corresponding transmission of cell detection signals is shown, according to an exemplary embodiment. In some embodiments, flow 700 is implemented to group LAA-LTE capable devices in an environment, to provide synchronized measurement gaps and to allow PSS and SSS transmission in the gaps (e.g., to transmit signals as described in FIGS. 3-6). For example, the measurement gaps for various LAA-LTE capable devices could occur independently, so gaps could be scheduled at probable opportunities on the unlicensed spectrum when all the devices are able to transmit. In some embodiments, the measurement gaps are synchronized to allow transmissions to occur from all devices at the same time. This makes the transmitting of the detection symbols dynamic rather than static.

The small cells could detect and measure candidate LAA cells (e.g., small cells, user end devices, etc.) on the unlicensed bands. The small cells would obtain opportunities to transmit associated LAA cell detection signals, and would be in contention with other devices on the unlicensed band. This contention could prevent LAA-LTE small cells from getting predetermined periodic opportunities to transmit cell detection signals.

Measurement gaps are set with particular timeframes (e.g., 40 ms or 80 ms) in some embodiments. The measurement gaps are set for each user end device and apply to all cells in an environment in some embodiments. This can enable a UE to make inter-frequency measurements while not listening to a serving cell during the gaps in some embodiments. The PSS and SSS transmissions then occur at fixed subframes (e.g., in 5 ms intervals) because the PSS and SSS are used to determine slot/frame boundaries in some embodiments. Including the RF switching time, the LTE measurement gaps can be slightly longer than the fixed subframes (e.g., 6 ms, the 5 ms interval plus the RF switching time) in some embodiments. Therefore, flow 700 accounts for the possible aperiodic transmissions of the LAA-LTE APs and the overhead for the transmissions in some embodiments.

User end devices in the environment are grouped and provided synchronized measurement gaps such that all the user end devices perform LAA-LTE cell detection and measurement on a particular frequency at the same time duration. PSS and SSS transmissions are coordinated during these measurement gaps in some embodiments.

Since the LAA-LTE APs are on different bands, the user end devices can use different RF chains for receiving and transmitting data in some embodiments. The traditional carrier aggregation can cause measurement gaps to occur on both the primary and secondary cells at the same time in some embodiments. The primary and secondary cells coordinate amongst themselves so that they do not transmit to the user end device during those instances. In the case of LAA, this coordination causes additional restrictions, as the LTE cell measurement gaps, the LAA cell measurement gaps and the unlicensed spectrum gaps occur together in some embodiments. Having measurement gaps on the LTE and LAA cells independent allows the LAA gaps to be reset according to the probable opportunities on the unlicensed spectrum in some embodiments. It is desirable to have no measurement gaps on the LTE cells while measuring LAA cells in some embodiments.

In some embodiments, PSS and SSS transmission timing by the LAA-LTE AP (as described above in FIGS. 3-6) are dynamic in nature, allowing for faster cell detection and measurement in the environment. The transmissions occur at fixed subframes (e.g., 5 ms) since the signals are used to determine slot/frame boundaries. The LTE measurement gaps are therefore slightly larger (e.g., 6 ms) after including the RF switching time in some embodiments. This format reduces the air time required for transmitting PSSs and SSSs, as they can be transmitted in the RF switching time gap (e.g., 1 ms) for which the channel could be reserved (e.g., the time does not need to be a multiple of the fixed subframe (e.g., 5 ms) from the previous PSS and SSS transmission) in some embodiments.

Referring to flow 700 of operations, flow 700 includes dynamically determining when to transmit the plurality of synchronization signals (e.g., PSS, SSS) within the timeframe based on availability of a channel on the unlicensed band (operation 702). For example, operation 702 includes determining a fixed timeframe corresponding with the LTE measurement gaps as described above.

Flow 700 further includes transmitting synchronization signals over the channel a plurality of times during a timeframe for transmission (operation 704). The timeframe for transmission is determined at operation 702 as described above. The synchronization signals can include, for example, PSS and SSS, as described with reference to FIGS. 3-6. Step 704 can include any number of LTE devices transmitting synchronization signals in the environment in some embodiments.

The plurality of times at which the synchronization signals are transmitted are aperiodic in some embodiments. The user end devices account for the aperiodic transmissions based on the fixed subframes as described above in some embodiments.

Flow 700 further includes coordinating data transmissions of LTE devices based on the synchronization signals (operation 706). Operation 706 is executed as described above with reference to FIGS. 3-6.

The disclosure is described above with reference to drawings. These drawings illustrate certain details of specific embodiments that implement the systems and methods and programs of the present disclosure. However, describing the disclosure with drawings should not be construed as imposing on the disclosure any limitations that are present in the drawings. The present disclosure contemplates methods, systems and program products on any machine-readable storage media for accomplishing its operations. The embodiments of the present disclosure are implemented using an existing computer processor, or by a special purpose computer processor incorporated for this or another purpose. No claim element herein is to be construed as a "means plus function" element unless the element is expressly recited using the phrase "means for." Furthermore, no element, component or method step in the present disclosure is intended to be dedicated to the public, regardless of whether the element, component or method step is explicitly recited in the claims.

Embodiments within the scope of the present disclosure include machine-readable storage media for carrying or having machine-executable instructions or data structures stored thereon. Such machine-readable storage media can be any available media that can be accessed by a general purpose or special purpose computer or other machine with a processor. By way of example, such machine-readable storage media can include RAM, ROM, EPROM, EEPROM, CD ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable storage media. Machine-executable instructions include, for example, instructions and data which cause a general purpose computer, special purpose computer, or special purpose processing machine to perform a certain function or group of functions. Machine or computer-readable storage media, as referenced herein, do not include transitory media (i.e., signals in space).

Embodiments of the disclosure are described in the general context of method steps which are implemented in some embodiments by a program product including machine-executable instructions, such as program code, for example, in the form of program modules executed by machines in networked environments.

It should be noted that although the flowcharts provided herein show a specific order of method steps, it is understood that the order of these steps or operations can differ from what is depicted. Also two or more operations can be performed concurrently or with partial concurrence. Such variation will depend on the software and hardware systems chosen and on designer choice. It is understood that all such variations are within the scope of the disclosure.

The foregoing description of embodiments of the disclosure have been presented for purposes of illustration and description. It is not intended to be exhaustive or to limit the disclosure to the precise form disclosed, and modifications and variations are possible in light of the above teachings or can be acquired from practice of the disclosure. The embodiments were chosen and described in order to explain the principals of the disclosure and its practical application to enable one skilled in the art to utilize the disclosure in various embodiments and with various modifications as are suited to the particular use contemplated.

What is claimed is:

1. A method comprising:
    transmitting, at a first LTE device configured to transmit data over an unlicensed band, first synchronization data over a first frequency channel of the unlicensed band during a timeframe;
    transmitting, at one of the first LTE device or a second LTE device configured to transmit data over the unlicensed band, second synchronization data over a second frequency channel of the unlicensed band during the same timeframe, wherein the timeframe comprises a plurality of fixed subframes of the unlicensed band, the plurality of fixed subframes having equal length; and
    coordinating one or more data transmissions of at least one of the first LTE device or the second LTE device based on the synchronization data.

2. The method of claim 1, wherein the second synchronization data is associated with the second LTE device.

3. The method of claim 2, further comprising transmitting other synchronization data from each of a plurality of other LTE devices during the same timeframe over different frequency channels of the unlicensed band.

4. The method of claim 1, wherein at least one of the first synchronization data or the second synchronization data comprises an offset indication, and wherein the method further comprises selecting, by at least one of the first LTE device or the second LTE device, a time at which to transmit at least one subsequent synchronization signal from among a plurality of times based on the offset indication.

5. The method of claim 1, wherein the second synchronization data has a same data type as the first synchronization data.

6. The method of claim 1, wherein the second synchronization data has a different data type than the first synchronization data.

7. A method comprising:
    transmitting, by a plurality of Long Term Evolution (LTE) devices configured to transmit data over an unlicensed band, a plurality of synchronization signals over a channel of the unlicensed band a plurality of times during a timeframe for transmission of synchronization signals, wherein the timeframe comprises a plurality of fixed subframes of the unlicensed band, the plurality of fixed subframes having equal length; and
    coordinating one or more data transmissions of a first LTE device and a second LTE device of the plurality of LTE devices based on the synchronization signals.

8. The method of claim 7, wherein the plurality of times at which the plurality of synchronization signals are transmitted are nonperiodic.

9. The method of claim 7, further comprising measuring, at a user device, a relative timing associated with at least one of the plurality of synchronization signals based on the at least one synchronization signal.

10. The method of claim 9, further comprising estimating, at the user device, a location of at least one of the first LTE device or the second LTE device based on the relative timing.

11. The method of claim 7, wherein transmitting the plurality of synchronization signals comprises dynamically determining when to transmit the plurality of synchronization signals within the timeframe based on availability of the channel.

12. The method of claim 7, wherein the synchronization signals are transmitted from each LTE device during the timeframe over different frequency channels of the unlicensed band.

13. The method of claim 12, wherein the plurality of LTE devices belong to a plurality of small cells.

14. The method of claim 7, wherein at least one transmission occurs over one of the fixed subframes and a switching time gap occurring after the fixed subframe.

15. An LTE device configured to transmit data over an unlicensed band, comprising:
    circuitry configured to:
        transmit first synchronization data over a first frequency channel of the unlicensed band during a timeframe;
        receive second synchronization data over a second frequency channel of the unlicensed band during the same timeframe, wherein the timeframe comprises a plurality of fixed subframes of the unlicensed band, the plurality of fixed subframes having equal length; and
        coordinate one or more data transmissions over the unlicensed band based on the synchronization data.

16. The LTE device of claim 15, wherein the second synchronization data is associated with and received from a second LTE device.

17. The LTE device of claim 16, wherein the circuitry further is configured to receive synchronization data from each of a plurality of LTE devices during the same timeframe over different frequency channels of the unlicensed band.

18. The LTE device of claim 15, wherein at least one of the first synchronization data or the second synchronization data comprises an offset indication, the circuitry further being configured to select a time at which to transmit at least one subsequent synchronization signal from among a plurality of times based on the offset indication.

19. The LTE device of claim 15, wherein the second synchronization data has a same data type as the first synchronization data.

20. The LTE device of claim 15, wherein the second synchronization data has a different data type than the first synchronization data.

* * * * *